United States Patent Office 3,269,994
Patented August 30, 1966

3,269,994
SOLVENT-RESISTANT PRESSURE-SENSITIVE ADHESIVE COATING AND METHOD OF PRODUCING THE SAME
Milton B. Horn, Warren Township, Somerset County, and Vincent P. Capone, Seabright, N.J., assignors to Catalin Corporation of America, a corporation of Delaware
No Drawing. Filed Sept. 30, 1963, Ser. No. 312,317
8 Claims. (Cl. 260—86.1)

This invention relates to solvent-resistant pressure-sensitive adhesive coatings having the balance of cohesive and adhesive properties normally associated with such products and to a method of applying the novel coatings upon various substrates to form useful articles of commerce.

Normally tacky and pressure-sensitive adhesives are well known materials which, when applied to tapes, webs, sheets and other substrates, are used in many applications for sealing, fastening, masking purposes, etc. More and more there has been a demand in the art for pressure-sensitive adhesives which can be used in more diverse applications once thought outside the scope of such products. For example, pressure-sensitive adhesive tapes might be used to cover electrical joints in transformers where they would be subjected to continuous service in hot oil. Pressure-sensitive clothing-identifying tapes may be subjected to tumbling in hot organic cleaning solvents and hot aqueous solutions of detergents. Electrical harnesses in aircraft wrapped with pressure-sensitive adhesive tapes may be subjected to contact with engine fuels, hot lubricating oils and hydraulic fluids at wide extremes of low and high temperatures.

Conventional pressure-sensitive adhesives would normally fail in such applications, due to the deteriorating effects of contact with solvents and temperature extremes. The art has suggested that the solubility of the pressure-sensitive adhesives be reduced by use of a crosslinking mechanism during preparation in order to improve their resistance to solvent attack. The difficulty with crosslinked pressure-sensitive adhesives is that a small degree of crosslinking does not adequately improve the resistance to solvent attack and larger degrees of crosslinking, on the other hand, normally cause the pressure-sensitive adhesive to lose the fundamental requirements of tack and adhesiveness. Thus, of all the many crosslinking systems which have been proposed, few have been used successfully commercially, and even as to those that have been used, there are still disadvantages, i.e., the excessive time of cure required, at high temperatures and in the presence of strong catalysts which degrade various substrates that otherwise might be desirably coated with the pressure-sensitive adhesive.

It has now been discovered that interpolymers of polymerizable organic compounds containing a single vinyl group ($CH_2=CH-$) per molecule and a small amount of a copolymerizable acrylate or methacrylate selected to be capable of supplying normal or isomeric hydroxyalkyl groups to the interpolymer can, contrary to expectations, be crosslinked at elevated temperatures in a very short time of cure and without the need for catalysts, accelerators, promoters or other such agents normally used to cure conventional crosslinked pressure-sensitive adhesive resins. The above-described crosslinked interpolymers have excellent resistance to solvent attack and, moreover, are storage stable for extended periods of time when in the uncured state prior to crosslinking. The fact that such interpolymers can be crosslinked with merely a mild heat treatment is of great importance since pressure-sensitive adhesives compounded therefrom can be successfully applied to many desirable substrates such as clear thermoplastic film without deteriorating the substrate as would be the result under conventional more stringent conditions of cure. Indeed, in the pressure-sensitive adhesives of the invention, curing and crosslinking in effect are simply incidental to drying and the properties of pressure-sensitive adhesiveness are developed in a rapid and relatively effortless manner.

In accordance with the invention, novel solvent-resistant pressure-sensitive adhesive coatings are formed by copolymerization of two different groups of monomers, the Group I monomers being comprised in general of at least one organic compound containing a single vinyl group ($CH_2=CH-$) per molecule. Various types of polymerizable organic compounds may be used as the Group I monomer. Among the useful compounds are acrylic acid esters of aliphatic and cycloalkyl alcohols, for example, methyl acrylate, ethyl acrylate, propyl acrylate, isobutyl acrylate, hexyl acrylate, cyclopentyl acrylate and cyclohexyl acrylate. Other Group I monomers which may be used are the corresponding methacrylic acid esters of the above-named aliphatic and cycloalkyl alcohols, and others. There can also be used vinyl esters of aliphatic carboxylic acids such as vinyl formate, vinyl acetate, vinyl propionate, vinyl butyrate, vinyl isobutyrate, vinyl lactate, vinyl laurate, as well as vinyl esters of aromatic carboxylic acids such as vinyl benzoate, vinyl acetylsalicylate, vinyl chlorobenzoate, vinyl salicylate and vinyl toluate. Other vinyl compounds which may be used include vinyl chloride, vinylidene chloride and aromatic polymerizable vinyl compounds such as styrene, a-methylstyrene and vinyl toluene.

In order for the interpolymers of the invention to have the required inherent pressure-sensitive adhesive properties, it is necessary that at least about 50% by weight of the Group I monomers consist of acrylic acid ester of non-tertiary aliphatic alcohols having a carbon-to-carbon chain length of from 4 to 20 carbon atoms. Such esters are exemplified by compounds such as butyl acrylate, isobutyl acrylate, hexyl acrylate, 2-ethylhexyl acrylate, octyl acrylate, nonyl acrylate, decyl acrylate, dodecyl acrylate, stearyl acrylate, etc. Such acrylic acid esters of non-tertiary aliphatic alcohols having a chain length of 4 to 20 carbon atoms contribute inherent pressure-sensitive adhesiveness to the interpolymers of the invention and their presence in the proportion of at least 50% by weight of the Group I monomers is accordingly essential. The balance of the Group I monomers may consist of one or more of the other polymerizable organic compounds containing a single vinyl group per molecule, which have been described hereinabove.

As for the Group II monomer, this may be represented by the following formula:

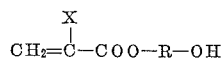

in which X may be hydrogen or a methyl group and R is an aliphatic chain having from 1 to 6 carbon atoms. The Group II monomer accordingly is an acrylic acid or methacrylic acid ester of aliphatic dihydroxy alcohols, which esters introduce hydroxyalkyl groups into the copolymerized interpolymer of the invention. Specific compounds which may be used as the Group II monomer are hydroxymethyl acrylate, hydroxyethyl acrylate, hydroxypropyl acrylate, hydroxybutyl acrylate, hydroxyamyl acrylate, hydroxyhexyl acrylate and corresponding esters of methacrylic acid in place of the acrylic acid esters named above.

In preparing the interpolymers of the invention, the Group I monomers are used in the largest proportion and may comprise from about 70 to about 97% of the total weight of the Group I and Group II monomers. In preferred embodiments, the Group I monomers comprise from about 83 to about 92% of the total monomers. The Group II monomers correspondingly should comprise from about 30% to about 3% of the total monomers used and preferably from about 17% to 8% of the total monomer system. As previously mentioned, at least 50% by weight of the Group I monomers must comprise one or more acrylic acid ester of non-tertiary aliphatic alcohols having a chain length of 4 to 20 carbon atoms.

In the spectrum of interpolymers which may be prepared in the above-defined ranges of proportions, it has been found that some may have excellent tack and adhesiveness, but may be somewhat deficient in cohesive strength. It has also been found that such deficiency in cohesive strength may be overcome by adding, after copolymerization of the interpolymer has been completed but prior to cure, partly condensed and alkylated urea-formaldehyde or melamine-formaldehyde resins or mixtures thereof. Such materials are known in the art and are prepared by condensing formaldehyde with urea or melamine and thereafter alkylating the methylol urea or melamine derivatives with additional formaldehyde or aliphatic alcohols. The urea or melamine derivatives may be added to the interpolymers in relative weight proportions of about 1 to 15 parts of urea or melamine derivatives to about 99 to 85 parts of the copolymerized interpolymer. Generally speaking, it is preferred that the partly condensed alkylated urea-formaldehyde or melamine-formaldehyde resins be added to the copolymerized interpolymer of the invention in the weight proportions of about 2 to 6 parts to about 98 to 94 parts of the interpolymer.

Of the partly condensed alkylated urea or melamine-formaldehyde compounds mentioned, one compound in particular has been found to give excellent results as an additive material for improving the cohesive properties of the interpolymers with which it is admixed and at the same time remaining completely stable in the admixture over extensive periods of storage. This compound is N,N',N''-tris(dimethoxymethyl) melamine and has the following formula:

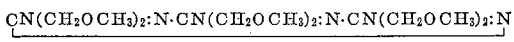

The compound is prepared in conventional manner by condensing 1 mol of melamine with at least 6 mols of formaldehyde to form hexamethylol melamine and then the hexamethylol melamine is etherified in the presence of an acid catalyst with at least 6 mols of methyl alcohol to form the compound. The compound may be added to the copolymerized interpolymers of the invention in relative weight proportion of about 1 to 15 parts of the compound to about 99 to 85 parts of interpolymer, and preferably the proportions of about 2 to 5 parts of the compound to about 98 to 95 parts of the interpolymer are employed.

The copolymerized interpolymers of the invention may be prepared with the conventional oxidation catalyst systems for carrying out vinyl type polymerizations, for example, inorganic oxidation catalyst systems such as combinations of persulfate salts and meta-bisulfite or bisulfite salts may be used. Also, organic catalyst systems utilizing organic peroxides such as benzoyl peroxide or di-tert.-butyl peroxide may be employed.

The polymerization may be carried out in organic solvents or as an emulsion polymerization in aqueous medium in which the usual emulsifying agents, detergents and surfactants are used. Copolymerization of the Group I and Group II monomers to form the interpolymers of the invention may be carried out over a period of 2 to 14 hours at temperatures from about 80° F. to 230° F. at redox or reflux. The interpolymers are usually recovered as solutions or aqueous dispersions containing from about 20% to 60% of interpolymer solids and having a viscosity at room temperature of from about 10 to 50,000 centipoises. The interpolymers while in the form of such solutions or dispersions have very long shelf lives and will remain stable in storage at ordinary atmospheric temperatures.

The interpolymers formed in accordance with the invention may be applied to various flexible substrates such as tapes, sheets, webs and the like, alone or in combination with pigments, fillers, coloring agents and other conventional ingredients, to form products which are useful for sealing, fastening, marking and masking purposes. The interpolymers, in the form of organic solution or an aqueous dispersion as initially prepared, can be applied to the substrate in any desired thickness and then the interpolymers will have to be both dried and cured to develop the desired pressure-sensitive adhesive properties.

It is an important feature of the invention that the interpolymers can be dried and cured without catalysts by a relatively mild heat treatment. Curing and drying can usually be achieved by subjecting the interpolymer coating to temperatures of from about 400° F. to about 250° F. for a period of time ranging from about ½ to about 120 minutes, the time of cure varying inversely with the temperature for any specific interpolymer. In some cases, cure may be effected even at lower temperatures, down to 150° F., for one hour.

After the heat treatments described, the dried and cured interpolymer will be internally crosslinked with consequent development of excellent resistance to solvent attack and it is believed that crosslinking takes place through reactions of the alcoholic hydroxyl groups supplied by the Group II monomers. After curing of the interpolymer coating upon the substrate, the assembly is ready for immediate use in forming pressure-sensitive adhesive bonds with other surfaces.

Further details of the invention will be illustrated by the following examples which constitute preferred embodiments thereof. All proportions given in the examples are by weight unless otherwise indicated.

*Example 1*

An interpolymer was prepared in accordance with the invention by mixing 200 parts of ethyl acrylate, 206 parts of 2-ethylhexyl acrylate (Group I monomers) and 43 parts of beta-hydroxyethyl methacrylate (Group II monomer) and 1047 parts of acetone. To this mixture was added 2 parts of benzoyl peroxide and the mixture was heated to reflux temperature for a period of 6 hours. Thereafter, another 2 parts of benzoyl peroxide was added and reflux continued for an additional 8 hours. At the end of this time, copolymerization was substantially completed and the interpolymer was cooled. The resulting liquid product had a non-volatile content of 30.14% by weight and a viscosity of about 500 centipoises.

The solution of interpolymer prepared as described was then coated on a clear 1½ mil thick film of polyethylene terephthalate and the coating was dried and cured in an oven at 300° F. for a period of three minutes. The interpolymer coating after this time was clear, colorless and tacky, with desired pressure-sensitive adhesive properties.

The interpolymer solution was coated on a second sample of plastic tape and this time the coating was dried at 125° F. for thirty minutes. This sample of interpolymer was also clear, colorless and tacky.

Both tape samples with the interpolymer coatings dried thereon were then placed in a container of acetone. The interpolymer dried at 125° F. dissolved completely in one minute whereas the interpolymer cured at 300° F. after fifteen minutes swelled only slightly, continued to adhere to the plastic substrate and showed no wrinkling whatever.

*Example 2*

An interpolymer was prepared in the manner described in Example 1 except that ethyl methacrylate was substituted for the Group II monomer betahydroxyethyl methacrylate. The interpolymer solution so prepared was coated on the plastic tape and cured at 300° F.

for three minutes, as in Example 1, and then placed in acetone. In one minute, the interpolymer coating completely dissolved, indicating that the alcoholic hydroxyl group was critically essential to achieve the excellent solvent resistance of the Example 1 interpolymer.

*Example 3*

An interpolymer was prepared as in Example 1, but only 21.5 parts of beta-hydroxyethyl methacrylate, one half the amount used in Example 1, was employed. After the interpolymer resin was coated on the plastic tape and cured at 300° F. for three minutes, it was then adhered to a stainless steel plate and subsequently peeled off the plate. The interpolymer tended not to lift cleanly from the plate and there was some evidence of splitting of the adhesive coating, indicating poor cohesive strength.

To 97.5 parts of the solution of interpolymer was added 2.5 parts of N,N',N''-tris(dimethoxymethyl) melamine. This interpolymer was then cured, adhered to the stainless steel plate and then peeled off in the same manner as with the previous portion. The interpolymer adhesive which was cured in the presence of N,N',N''-tris(dimethoxymethyl) melamine peeled cleanly from the steel plate and showed no sign of splitting. Thus the cohesive strength was considerably improved by the use of the small amount of the melamine compound.

*Example 4*

An interpolymer was prepared by blending 75 parts of butyl acrylate, 3 parts of methyl acrylate, 10 parts vinyl acetate (Group I monomers) and 15 parts of hydroxypropyl acrylate (Group II monomer). To this mixture was added 100 parts of toluene and, in three portions, 5 parts of benzoyl peroxide, the first portion initially and remaining two portions at subsequent intervals during polymerization. After polymerization was completed in about 8 hours, the interpolymer solution obtained had non-volatile content of approximately 50% by weight and a viscosity at room temperature of 2700 centipoises. To 100 parts of the interpolymer solution was added 2 parts of a partially condensed isobutylated urea-formaldehyde resin. This mixture was coated and cured upon polyethylene teraphthalate plastic film as in Example 1, the cure in this case being completed in two minutes at 275° F. The resulting interpolymer pressure-sensitive adhesive showed excellent resistance to redissolving in a solvent consisting of a mixture of aliphatic and aromatic hydrocarbons.

*Example 5*

An interpolymer was prepared in an emulsion polymerization system by mixing 1386 parts of 2-ethylhexyl acrylate, 900 parts of vinyl acetate (Group I monomers) and 254 parts of hydroxypropyl methacrylate (Group II monomer). The redox catalyst system consisted of 7.5 parts of ammonium persulfate and 7.8 parts of sodium metabisulfite. The surfactant system consisted of 250 parts of Abex 18S, an anionic surfactant manufactured by American Alcolac Corporation and about 30% active, and 153 parts of a blend of non-ionic surfactants comprised of an octylphenoxy polyethylene oxide where the mol ratio of ethylene oxide to alkyl-aryl content was approximately 22:1. Sufficient water was added to form an aqueous emulsion system in which the concentration of the mixture of monomers was approximately 20% by weight.

A portion of the inorganic catalysts was added to start a polymerization after which the temperature was held at about 55° C. while the remaining portions of the monomers and catalysts were continuously added over a three hour period. Sufficient water was used as required to yield a polymerized emulsion interpolymer having a non-volatile content of 46% and viscosity at room temperature of 300 centipoises. Before coating the interpolymer upon a substrate, a small amount of hydroxyethyl cellulose thickener was added to improve the coating properties.

Thereafter the aqueous emulsion of interpolymer was coated and cured upon plastic tape as in Example 1, and the resulting interpolymer pressure-sensitive adhesive had excellent tack, good cohesion and was resistant to immersion in trichlorethylene for 24 hours.

*Example 6*

Pressure sensitive adhesive coatings were prepared on polyethylene teraphthalate substrate film using the interpolymers prepared in Examples 1, 4 and 5 and the blend of interpolymer and N,N',N''-tris(dimethoxymethyl) melamine made in Example 3. The coatings were cured upon the plastic film at 300° F. for three minutes and then tested for adhesion to #4 finish stainless steel plate by the conventional pull test. The test was conducted on a 1 inch wide sample of tape which was peeled off the plate at 180° with respect to the stainless steel plate at a rate of 12 inches per minute, and the ounces of pull required to maintain this rate of peel-back was recorded.

Prior to running the pull test all of the samples, while adhered to the stainless steel plate, were immersed in jet engine fuel for a period of 72 hours. After the peel test had been completed, each sample was examined to determine the degree of edge attack upon the interpolymer adhesive by the jet engine fuel, and the distance in from the edge of the tape over which the interpolymer adhesive was either dissolved or seriously degraded was recorded.

The results of these tests are given in the following table:

| Interpolymer Adhesive | Ex. 1 | Ex. 3 | Ex. 4 | Ex. 5 |
| --- | --- | --- | --- | --- |
| 180° Pull, ozs./inch | 42 | 55 | 47 | 38 |
| Edge Attack, inches | none | none | 3/32 | 3/32 |

As shown above, each of the cured pressure-sensitive interpolymer samples had excellent resistance to the prolonged exposure to solvent, the maximum degree of edge attack being only 3/32 of an inch for the interpolymer adhesive of Example 5. Furthermore, each of the samples retained a more than adequate degree of adhesiveness, the minimum but nonetheless high force of adhesion being 38 ounces per inch of 180° pull-back for the Example 5 interpolymer adhesive.

It will be understood that it is intended to cover all changes and modifications of the preferred embodiments of the invention, herein chosen for the purpose of illustration, which do not constitute departures from the spirit and scope of the invention.

What is claimed is:

1. An article of manufacture comprising a flexible substrate and a normally tacky, pressure-sensitive adhesive coating thereon consisting essentially of heat-modified interpolymer of (1) polymerizable organic compounds containing a single vinyl group per molecule of which at least about 50% by weight comprises acrylic acid ester of non-tertiary aliphatic alcohols having a carbon-to-carbon chain length of from 4 to 20 carbon atoms and (2) a copolymerizable compound having the formula:

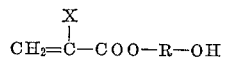

in which X is selected from the group consisting of hydrogen and methyl radical, and R is an alkyl radical having from 1 to 6 carbon atoms, the relative weight proportions of compounds (1) and (2) in said interpolymer being from about 70% to about 97% of compound (1) and correspondingly from about 30% to about 3% of compound (2), said compounds (1) and (2) and the proportions thereof being further selected to yield an interpolymer which is capable of developing the aforementioned attributes of pressure-sensitive adhesiveness in said coating upon simple heat treatment of the interpolymer alone in the absence of curing agents.

2. An interpolymer as in claim 1 which includes an alkylated condensation product of formaldehyde and an amino compound selected from the group consisting of urea, melamine and mixtures thereof, said condensation product being used in the proportions of about 1 to about 15 parts by weight per about 99 to about 85 parts by weight of said interpolymer.

3. An interpolymer as in claim 1 which includes from about 1 to about 15 parts by weight of N,N',N''-tris(dimethoxymethyl) melamine per about 99 to about 85 parts by weight of said interpolymer.

4. An interpolymer as in claim 1 which has been modified by heat treatment at 400° F. to about 250° F. for from about ½ to about 120 minutes.

5. In the manufacture of an article comprising a flexible substrate and a pressure-sensitive adhesive coating thereon, the improved method consisting essentially of the steps of mixing (1) polymerizable organic compounds containing a single vinyl group per molecule of which at least about 50% by weight comprises acrylic ester of nontertiary aliphatic alcohols having a carbon-to-carbon chain of from 4 to 20 carbon atoms with (2) a copolymerizable compound having the formula:

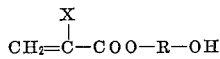

in which X is selected from the group consisting of hydrogen and methyl radical, and R is an alkyl radical having from 1 to 6 carbon atoms, the relative weight proportions of compounds (1) and (2) in said mixture being from about 70% to about 97% of compound (1) and correspondingly from about 30% to about 3% of compound (2), said compounds (1) and (2) and the proportions thereof being further selected to yield an interpolymer which is capable of developing the aforementioned attributes of pressure-sensitive adhesiveness in said coating upon simple heat treatment of the interpolymer alone in the absence of curing agents, then polymerizing said mixture at elevated temperatures to form the selected interpolymer of compounds (1) and (2), coating said interpolymer upon the flexible substrate and then heating said coated interpolymer to develop therein said attributes of pressure-sensitive adhesiveness.

6. A method as in claim 5 which includes the step of adding to said polymerized interpolymer, prior to the heating thereof, an alkylated condensation product of formaldehyde and an amino compound selected from the group consisting of urea, melamine and mixtures thereof, said condensation product being used in the proportions of about 1 to about 15 parts by weight per about 99 to about 85 parts by weight of said interpolymer.

7. A method as in claim 5 which includes the step of adding to said polymerized interpolymer, prior to the heating thereof from about 1 to about 15 parts by weight of N,N',N''-tris(dimethoxymethyl) melamine per about 99 to about 85 parts by weight of said interpolymer.

8. A method as in claim 5 wherein said heating step is done at temperatures from about 400° F. to about 250° F. for from about ½ to about 120 minutes.

References Cited by the Examiner
UNITED STATES PATENTS

| | | |
|---|---|---|
| 2,681,897 | 6/1954 | Frazier. |
| 2,819,237 | 1/1958 | Daniel _____ 260—29.4 |
| 2,923,653 | 2/1960 | Matlin et al. _____ 260—29.6 |

SAMUEL H. BLECH, *Primary Examiner.*

MURRAY TILLMAN, *Examiner.*

W. J. BRIGGS, Sr., *Assistant Examiner.*